United States Patent [19]

Sunderland

[11] 3,771,287

[45] Nov. 13, 1973

[54] DEAERATING OIL TANK

[75] Inventor: George E. Sunderland, Lake Park, Fla.

[73] Assignee: United Aircraft Corporation, East Hartford, Conn.

[22] Filed: Oct. 2, 1972

[21] Appl. No.: 294,401

[52] U.S. Cl. .................................. 55/182, 55/201
[51] Int. Cl. .......................................... B01d 19/00
[58] Field of Search ................ 55/41, 52, 182, 192, 55/199, 201

[56] References Cited
UNITED STATES PATENTS

| | | | |
|---|---|---|---|
| 1,752,215 | 3/1930 | Waters | 55/199 X |
| 2,737,857 | 3/1956 | Lee | 55/199 X |
| 2,797,767 | 7/1957 | Brooke et al. | 55/52 |

*Primary Examiner*—Frank A. Spear, Jr.
*Assistant Examiner*—Richard W. Burks
*Attorney*—Jack N. McCarthy

[57] ABSTRACT

An oil tank is constructed having a perforated funnel therein. Oil scavenged from the engine is delivered by a tube to an opening in the small bottom of the perforated funnel. The delivery tube passes over the large elongated open top of the funnel acting as a cover means and deflector. As the oil passes through this funnel in a direction of increasing cross sectional area its velocity is reduced. Large air bubbles escape directly to the top of the funnel and smaller air bubbles are strained out as the oil passes through the perforations in the funnel. The oil then passes through a baffle device below the perforated funnel to a small compartment in the bottom of the tank. An outlet in this chamber directs deaerated oil to the engine main pressure pump. In some installations the top of the funnel could follow closely the shape of the tank at that point and even be attached to the tank, so that all oil would have to pass through the perforations.

6 Claims, 4 Drawing Figures

PATENTED NOV 13 1973 3,771,287

DEAERATING OIL TANK

BACKGROUND OF THE INVENTION

This invention relates to oil tanks and more particularly to those wherein oil needs deaerating and in which a low volume of oil is used. One form of deaeration recently used was accomplished by a cylindrical deaerator which depended on the centrifugal force of swirling oil to free air bubbles from the oil. In this type of deaerator the flow was directed toward the tank outlet, often inducing vortices, and the downward flow prevented total wetting of the interior of the tank top. Total wetting is desired to prevent corrosion and to provide a medium for heat transfer in emergency situations. This cylindrical deaerator was sensitive to oil level, and at certain attitudes oil level would drop below the deaerator in the tank.

SUMMARY OF THE INVENTION

A primary object of the present invention is to provide an improved deaerating oil tank.

In accordance with the present invention a perforated funnel device is used having an increasing cross sectional area, extending away from the outlet, which reduces the velocity of the oil to permit large air bubbles to escape directly, many of the smaller bubbles are strained out as the oil passes through the perforations.

In accordance with a further aspect of the invention the oil flow is directed upward, reducing tank outlet vortices, and supplying oil for interior tank top wetting.

In accordance with a further aspect of the invention, a baffle device is located below the funnel for minimizing turbulence and swirling of the oil as it enters the chamber connected to the oil outlet.

It is noted that the perforated funnel and associated baffles can be used as an integral part of the tank structure, often eliminating weighty stiffeners or supports.

DESCRIPTION OF THE PREFERRED EMBODIMENT

Figure 1:
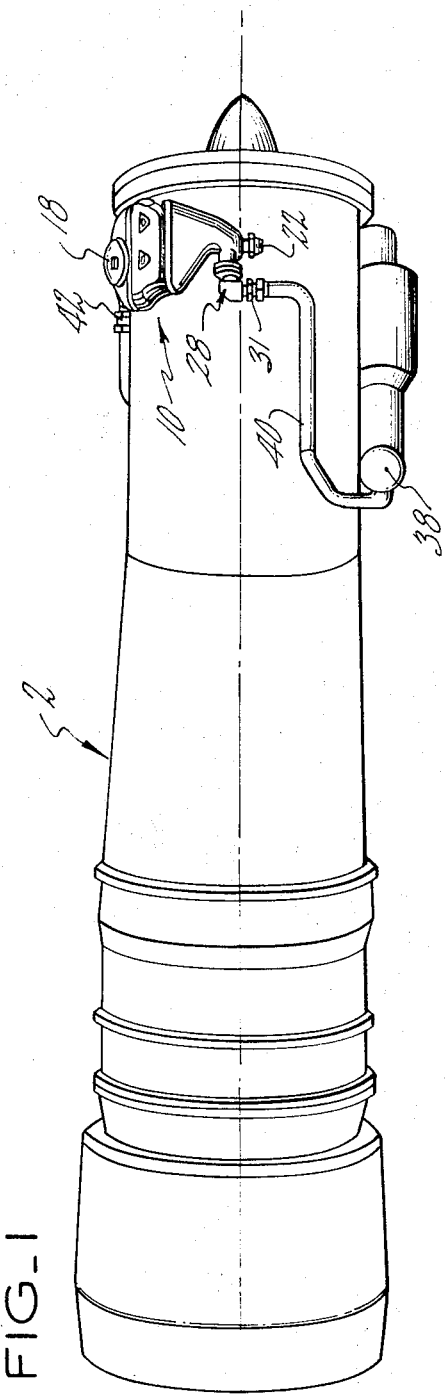
FIG. 1 is an external side view of an aircraft turbojet engine on which the invention is shown.
Figure 4:
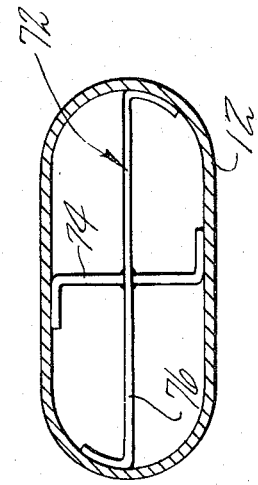
FIG. 4 is a sectional view taken along the line 4—4 of FIG. 2.
Figure 3:
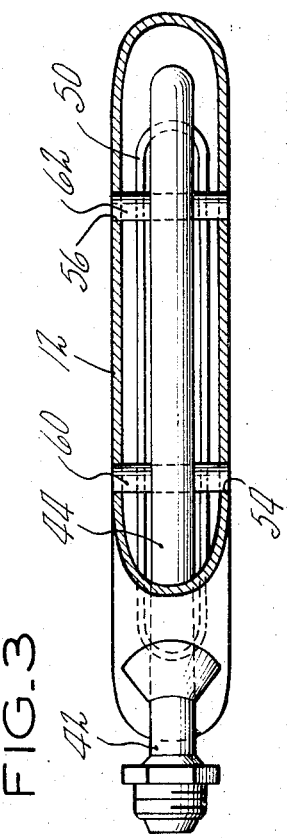
FIG. 3 is a sectional view taken along the line 3—3 of FIG. 2.

Referring to FIG. 1 a turbojet engine 2 is shown comprising a compressor section, burner section, turbine section and exhaust nozzle. The engine 2 is of the conventional type described in greater particularity in U.S. Pat. Nos. 2,711,631 and 2,747,367.

Figure 2:
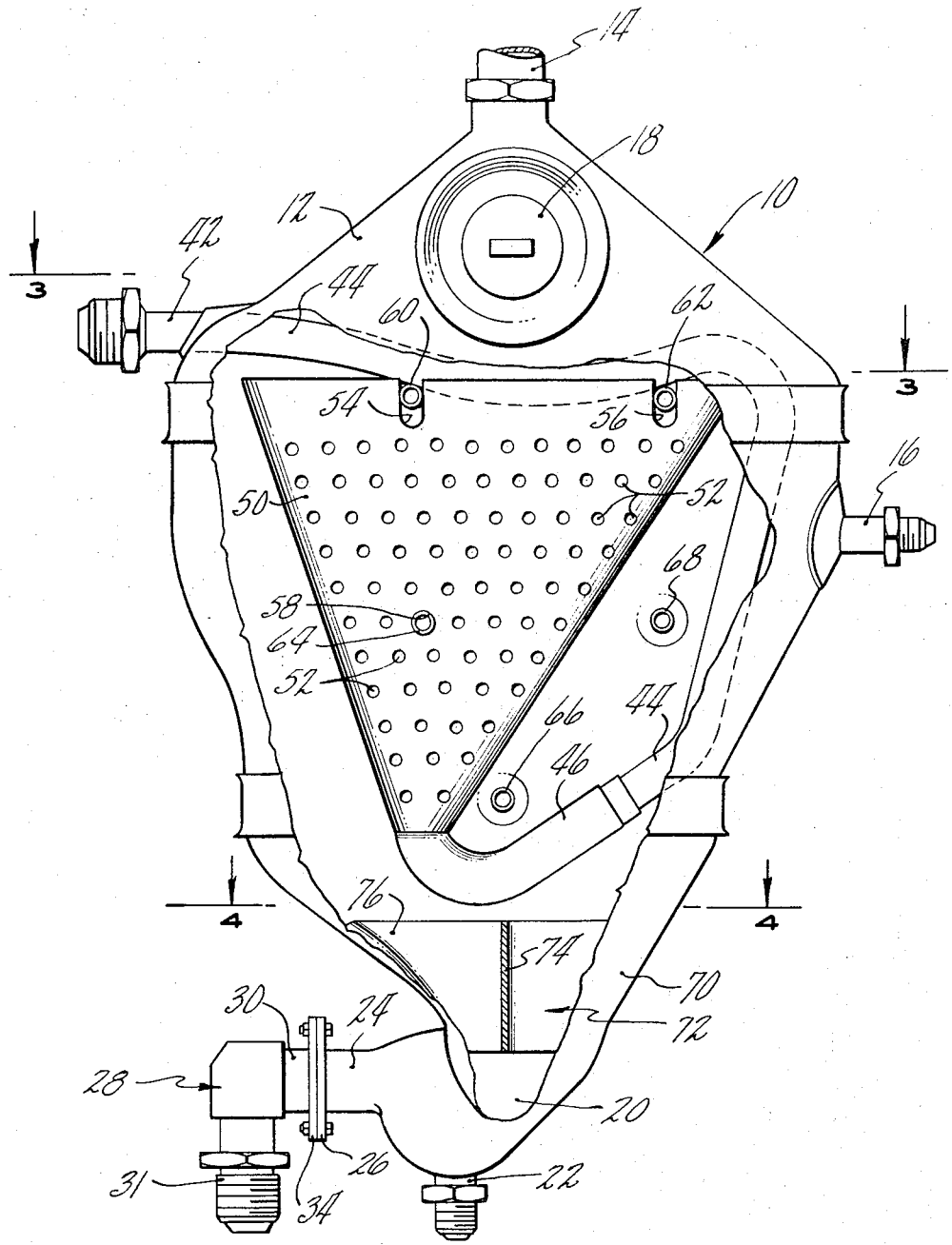
FIG. 2 is a front view of the deaerating oil tank with a section broken away to show the interior thereof.

Referring to FIG. 2 the deaerating oil tank 10 is shown in greater detail. The container 12 of the oil tank 10 is curved slightly as shown in FIG. 1 to fit against the engine as closely as possible. The container 12 includes a breather line 14 at the top thereof which for altitude flight can be connected to a pressurizing assembly (not shown) which will maintain a sea level pressure within the container 12. A small tube 16 extends from the side of said body and represents the heighth to which the oil tank should be filled with the engine at rest. Oil is poured into the tank body through an opening adjacent the top of the container which is shown closed by cover 18, when the body of the oil tank is low in oil, the oil can be poured in through this opening with the cover 18 removed and when the desired heighth is obtained oil will flow from tube 18 with a valving means (not shown) affixed thereto opened. A small compartment 20 is formed at the bottom of the body from which oil is drained through a pipe 22 when necessary. A valving means (not shown) controls flow through the pipe 22.

Oil is available for engine operation through an outlet line 24 which extends from the container 12 adjacent the chamber 20. This line 24 has a flange 26 around its free end. A connector 28 has an inlet 30 and an outlet 31 for directing oil to the engine. Inlet 30 has a flange 34 which is bolted to the flange 26 to provide flow between the line 24 and inlet 30. The outlet 31 is connected to the engine main pressure pump 38 by a connecting conduit 40 which has one end fixed to the inlet of the engine main pressure pump 38 and the other end fixed to outlet 31.

Oil is directed into the container 12 of the oil tank 10 by a short tubular section 42 which projects from outside of the body adjacent the top thereof. A tubular extension 44 of the tubular section 42 extends into the interior of the container in a manner to be hereinafter described. A perforated funnel 50 is fixedly mounted within said container with the wide portion adjacent the top of the container 12 and the narrow portion adjacent the bottom thereof of said container 12. The narrow end of the funnel is formed having an opening for receiving oil flow thereinto. The tubular extension 44 extends into the container from the tubular section 42 and is positioned over the top of the funnel 50 providing a cover means therefor, for a portion of the open end of the funnel 50, said cover means reducing the open area of the top of the funnel 50. The tubular extension 44 extends downwardly from the other side of the funnel 50 and is connected to a pipe section 46 extending from the opening in the bottom of the perforated funnel 50.

The funnel is shown perforated by a plurality of small openings 52. Three other larger openings 54, 56 and 58 also appear through the two sides of the perforated funnel 50. These openings permit the passage of tubular support members 60, 62 and 64 which are connected at each end to the sides of the container 12. The funnel 50 is also fixed to the tubular support members, such as by welding, to fixedly locate it within the container 12. The passages through the tubular support members can be used to bolt the oil tank 10 to the engine. Two other support members are shown at 66 and 68 which are connected only at their ends to the container 12.

The bottom of the container 12 also is substantially funnel shaped at 70 from a point adjacent the bottom of the funnel 50 to the top of the chamber 20. This funnel action at this point gathers the oil so that it can be directed to the engine main pressure pump 38. To further aid in gathering the oil at this point, and to prevent undue swirling and turbulence of the oil, a baffle device 72 is inserted in the lower portion of the funnel section 70 extending into the top of the chamber 20. This baffle device is formed having two crossing plates 74 and 76 which have their ends welded to the interior of the funnel section 70 of the container 12.

In operation the valve controlling the fill tube 16 is closed as is the valve controlling the drain pipe 22. The cover 18 is fixed in place and the breather line is maintaining a proper pressure within the system. Scavenge pumps return engine oil directly to the tubular section 42. The oil is then passed through tubular extension 44 and pipe section 46 to the bottom of the perforated funnel 50. The oil then passes up the funnel and out through openings 52 in the funnel and the restricted area at the top thereof. As the oil passes through the funnel air is removed by the funnel and permitted to rise to the top of the container. The remaining oil flows into the funnel section 70 where its turbulence is reduced by baffle means 72. From chamber 20 the oil flows through outlet line 24 to the engine main pressure pump 38. The oil is then directed to desired points within the engine needing oil; it is then returned by scavenge pumps to the tubular section 42.

In an oil system in which this deaerating oil tank was used, the capacity of the tank was approximately 2 to 3 gallons with no other large sump being provided.

I claim:

1. A deaerating oil tank having a container with a deaerator therein, said deaerator being funnel shaped and perforated, the large part of the deaerator funnel shape being at the top and the small part of the funnel shape being at the bottom, air outlet means at the top of the container, oil outlet means at the bottom of the container, said container having an oil inlet which is connected to said small end of the funnel shape deaerator.

2. A deaerating oil tank as set forth in claim 1 wherein cover means blocks a portion of the open large end of the funnel shape deaerator restricting oil flow therethrough.

3. A deaerating oil tank as set forth in claim 1 wherein a baffle means is located in the container adjacent the outlet.

4. A deaerating oil tank as set forth in claim 1 wherein the shape of the container is funnel shaped adjacent its bottom, the large part of the container funnel shape being approximately at the level of the small part of the deaerator funnel shape, a baffle means being located in the lower part of said container funnel shape.

5. A combination as set forth in claim 1 wherein said deaerator is fixedly mounted within said container, said mounting means including rods fixed to each side of the container and to the sides of the deaerator providing support for said container.

6. A deaerating oil tank as set forth in claim 5 wherein rods are hollow providing means whereby said container can be fixed to an engine.

* * * * *